July 11, 1950 E. A. ERNST 2,514,993

COUPLING DEVICE FOR CONVEYERS

Filed July 20, 1945

INVENTOR.
Earl A. Ernst
BY
Earl E. Moore
Atty.

Patented July 11, 1950

2,514,993

UNITED STATES PATENT OFFICE 2,514,993

COUPLING DEVICE FOR CONVEYERS

Earl A. Ernst, Bakersfield, Calif.

Application July 20, 1945, Serial No. 606,185

5 Claims. (Cl. 198—89)

This invention relates to a coupler device for pivotly joining together a pair of conveyors, chutes, or similar carrier means, one of the conveyors being provided with a track so that the coupler device can be shifted along it and thus provide a combination of conveyors that can be shortened or lengthened to suit the working space and/or the distance between two stations.

One of the principal objects of the invention is to present a new and novel shiftable coupling means for conveyors and the like, and particularly that type of conveyor employing endless belts for carrying objects from one station to another, the means comprising a truck-like carrier having a wagon type fifth wheel arrangement for supporting the end of one conveyor over the other, the supported conveyor being pivotally connected at one end with the fifth wheel so that the other end thereof can be raised and lowered as desired.

Another object is to provide a rolling coupler means for endless belt conveyors having special means incorporated therein which allows the conveyors to be adjustably positioned in a plurality of planes so that station to station connections can be made with the conveyors regardless of their difference in elevation or in angular horizontal position.

A still further object is to provide a coupler means for joining an end of one conveyor with another conveyor which involves but simple structural elements that provide a safe and sturdy connection, a coupler means that is dependable and capable of giving long service, and which is economical to make and manufacture.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

Figure 1:
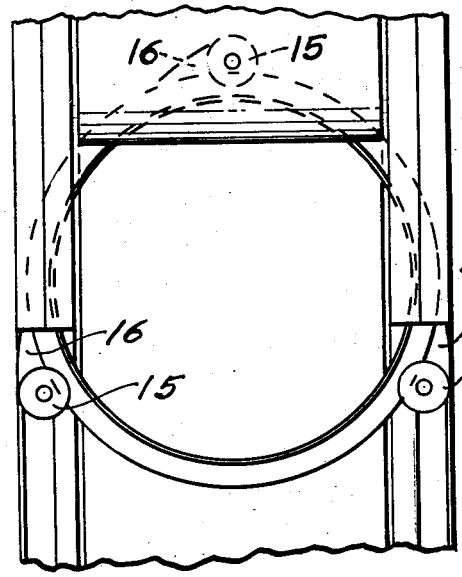
Fig. 1 is a plan view showing the jointure of two endless conveyors in combination with the coupling means of this invention, parts of the conveyors being broken away to avoid an unnecessary showing.
Figure 2:
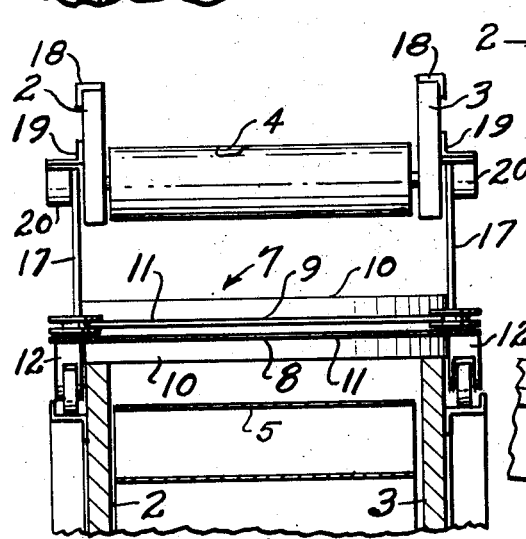
Fig. 2 is a vertical view taken substantially along the line 2—2 of Fig. 3.
Figure 3:
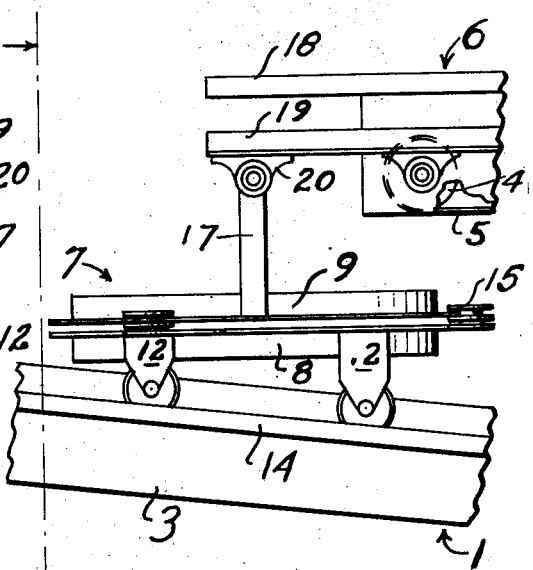
Fig. 3 is a side elevational view, but showing a large portion of the conveyors broken away.

The numeral 1 of the drawings indicates a lower conveyor that may be of the endless belt variety and somewhat similar to the endless belt conveyors shown in applicant's Patent Number 2,377,619, issued June 5, 1945, for Grading and Sacking Device. Such a conveyor has the pair of spaced apart sides or stringers 2 and 3 which are braced in a suitable manner so as to support and journal a roller 4 at each end which support an endless belt 5. One of the rollers of each conveyor is geared to a suitable power means, usually a slow speed electric motor, not shown. The other and upper conveyor is indicated at 6 which is constructed like the one just mentioned except for some minor details to be explained later.

Between the conveyor 1 and the conveyor 6 there is a truck or carrier unit 7 which is constructed in a manner similar to the fifth wheel of a wagon in order to prevent careening of the top conveyor. This truck comprises a lower horizontal angle iron element or member 8 and an upper horizontal angle iron element or member 9, both of these elements having the configuration of rings and each having vertical flanges 10 and horizontal flanges 11. The lower ring 8 has fixed to the vertical flange thereof the roller or wheel units 12, two on each side of the truck, the wheels of which ride in rails 13 and 14 which are Z-bars and which are securely bolted or otherwise fixed to the stringers 2 or 3. These rails run substantially the full length of the conveyor 1 so that the truck 7 can be shifted anywhere along the length of the lower conveyor.

The two ring elements 8 and 9 are slightly spaced apart in that the horizontal flange 11 of the upper ring has its outer margin in the grooves of a plurality of pulley-like wheels 15. The pulley-like wheels are placed about the upper ring element in a manner that the upper ring element cannot become separated from its position with respect to the lower ring element 8. Each pulley-like wheel is journalled as by a central pin 15' on a strong fin 16 which is welded or otherwise securely fixed to the lower ring element. Such a construction, presents a new type of fifth wheel that has a special use for conveyors and the like and which can be shifted along the lower conveyor 1, and thus provide a conveyor means that can be lengthened and shortened.

The upper ring element 9 has a standard 17 extending upwardly on each side thereof, the standards being welded or otherwise firmly fixed to the vertical and horizontal flanges thereof. The standards are very strong struts of steel and may be ribbed for greater strength in the event it becomes necessary. The top conveyor, on each side thereof, has a pair of angle irons 18 and 19 that are securely fastened, as by bolts or screws, to the side stringers 2 and 3, and these irons extend beyond the ends of the stringers, as shown, the lower irons having welded to the underneath portions of them the bearing elements 20 which have bearing pins that pass through their respective standards and are securely fixed thereto so that the top conveyor can be elevated at its opposite end or lowered to accommodate the requirements at its far end. The purpose of the iron extensions 18 is to provide a ready support for guide baffles and the like, not shown, which prevent loss of articles being dropped from the upper conveyor into the lower conveyor.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a coupler device for joining two conveyors together, a track longitudinally of one conveyor having a wheeled truck thereon adapted to roll substantially the full length of said one conveyor, a pair of superposed members on the truck, one of the members having means fixing it to the truck and means supporting a plurality of grooved wheels, the other member having a circular rail engaging the grooves of the wheels and made free to rotate through the grooves, said other member having standards with pivot means at the top portions thereof which give support to another conveyor.

2. In a coupler device for journalling a pair of conveyors together, an under conveyor having shiftable means thereon which support a frame member, the frame member having journalled grooved wheels thereon which are freely rotatable and spaced apart and arranged horizontally in a predetermined manner, an upper conveyor having at an end thereof a horizontally positioned circular flange which engages the grooves of all wheels and is trapped in position by the wheels so that one conveyor can be readily turned with respect to the other conveyor.

3. The device recited in claim 2 wherein a bracket means joins the upper conveyor with its circular flange, a pivot means in the bracket so that either conveyor can be raised or lowered independently.

4. In a coupler device for joining two conveyors together, a lower conveyor having a pair of spaced apart rails longtitudinally thereof, a truck having a plurality of wheels engaging the rails so that the truck can be shifted along the lower conveyor, the truck including a frame having means for supporting a plurality of grooved wheels in spaced apart relationship, a flanged member curved to provide a rail which rides in the grooves of the grooved wheels, means extending upwardly from the member having pivot means at the top portion thereof, and a top conveyor having extensions from an end thereof with means for engaging the recited pivot means so that the distal end of the top conveyor can be raised and lowered.

5. The coupler device recited in claim 4 wherein the frame and the flanged member are perimetrical with an opening through the central portion thereof, and the end of the top conveyor at the end having the extensions is positioned over the opening so that material falling from the top conveyor will pass through the opening and onto the lower conveyor.

EARL A. ERNST.

REFERENCES CITED

The following references are of record in the file of this patent:

UNITED STATES PATENTS

| Number | Name | Date |
|---|---|---|
| 1,271,627 | Stuart | July 9, 1918 |
| 1,818,168 | Smith | Aug. 11, 1931 |
| 1,932,897 | Jaggard | Oct. 31, 1933 |

FOREIGN PATENTS

| Number | Country | Date |
|---|---|---|
| 4,451 | Great Britain | Feb. 28, 1896 |